United States Patent Office.

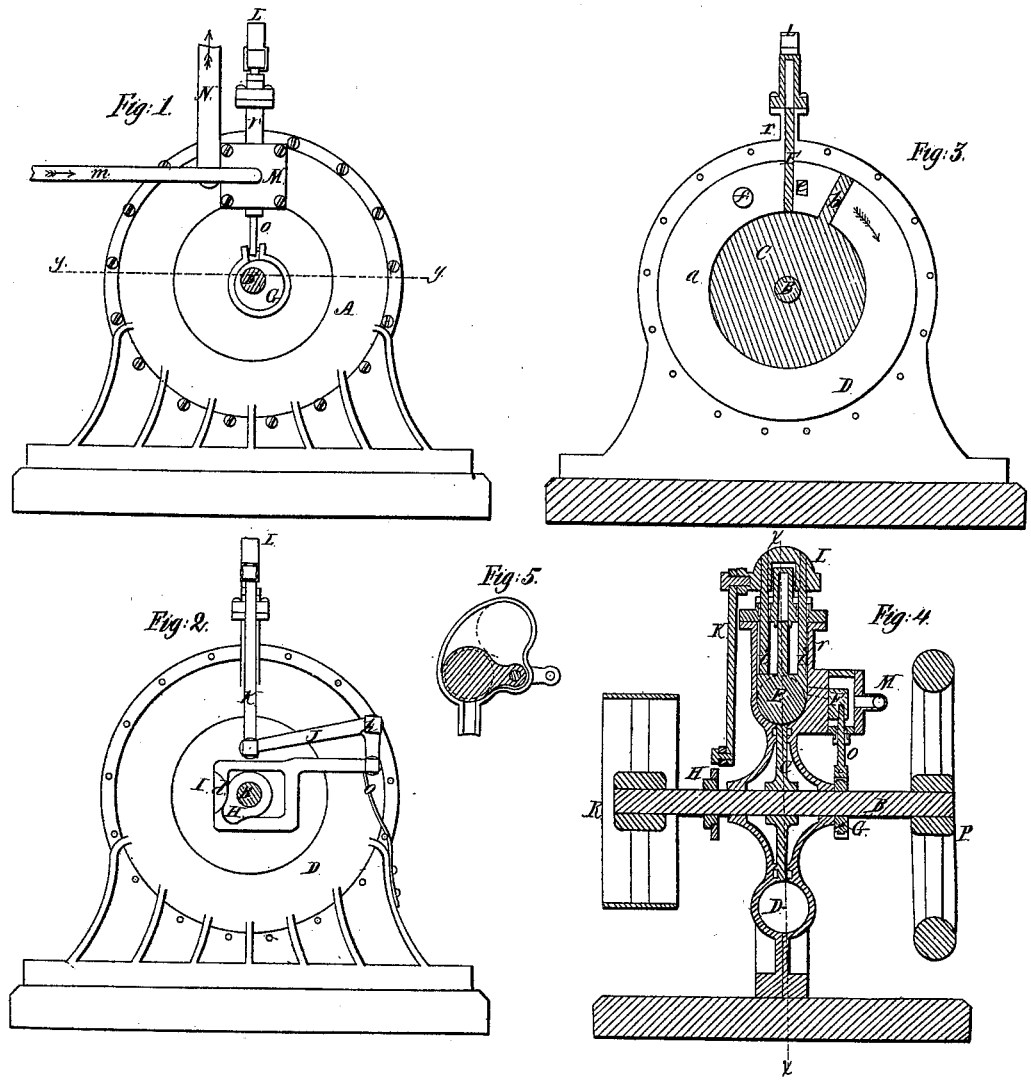

THOMAS McEWEN, OF CHICAGO, ILLINOIS.

Letters Patent No. 91,468, dated June 15, 1869.

---

IMPROVEMENT IN ROTARY STEAM-ENGINES.

---

The Schedule referred to in these Letters Patent and making part of the same.

---

*To all whom it may concern:*

Be it known that I, THOMAS MCEWEN, of Chicago, in the county of Cook, and State of Illinois, have invented certain new and useful Improvements in Rotary Steam-Engine; and I do hereby declare that the following is a full, clear, and exact description thereof, reference being had to the accompanying drawings, making part of this specification, and to the letters of reference marked thereon, like letters indicating like parts, wherever they occur.

To enable others skilled in the art to construct and use my invention, I will proceed to describe it.

My invention relates to rotary steam-engines, and consists principally in the arrangement of devices for operating the valves.

Figure 1 is a side elevation of my engine, with the balance-wheel removed.

Figure 2, an elevation of the opposite side from the above.

Figure 3, a vertical longitudinal section, on the line *x–x* of fig. 4.

Figure 4 is a vertical cross-section through the centre, on the line *y–y* of fig. 1.

Figure 5, a modified form of the stop-head valve.

The engine is of that class which consists of a circular body, or case, having mounted within it, on a shaft passing through the centre of the case, a hub of less diameter than the case itself, said hub being provided around or on its periphery with one or more radial heads or pistons, of such size and form as to fill the space between the outer side of the hub and the outer case, steam being admitted into the space behind the said arms or pistons, between them and valves which enter through the case, and extend into and against the periphery of the hub, the said valves being drawn out at regular intervals, to allow the piston-heads to pass.

In the drawing—

A represents the outer case, or body, formed in halves, and bolted together, and made with a flat base, so as to be readily and firmly fastened in position.

Through the centre of this case, at right angles, passes a shaft, B, as shown in figs. 3 and 4, the case having formed on it, at the centre, hubs, or extensions, as shown in fig. 4, and being for the purpose of lengthening the distance between the points of bearing of the shaft, and thus giving it firmer support.

Upon this shaft B, inside the case, is secured the circular head or disk C, concentric with the axis of said shaft, and of less diameter than the interior of the case A.

From a point beginning at the periphery of the disk C, and extending outward, the case A is widened and enlarged, so as to present, in cross-section, from said point outward, a circular or tubular form on its interior, and the whole forming a circular tubular chamber or cylinder, D, around in the outer portion of the case, and described from the axis of the shaft B as a centre.

On the periphery of the disk C is formed a radial head or piston, *b*, which fills the chamber D at that point.

Through the top of the case A enters a flat cut-off or valve, E, as clearly shown in figs. 3 and 4, which is capable of being moved vertically, and of a width greater than the diameter of chamber D, and rounded on its lower end, so that, when this valve is pushed into the case, and bears against the edge of the disk C, it will form a tight partition, or stop-head, across the chamber D.

It is evident that if steam be forced into the chamber D, between the stop-head and the piston *h*, the latter will be forced around in the chamber, moving with it the disk C, and revolving the shaft B and its connections.

When, however, the piston has travelled clear around the chamber, it will come up on the opposite side of the stop-head from that on which steam is admitted, and, unless said head is drawn out, would strike against it. To provide against this, there is connected with the said head suitable arms and levers, operated by a cam on shaft B, which, when the piston has almost reached the stop-head, draw said head back, and allow the piston to pass under, after which the head is immediately brought back across the chamber, the steam being cut off while the piston is passing under the head.

On top of the case is an extension-chamber, closed at the top, into which the stop-head passes when drawn up, the head having attached on top two stems *i*, which extend up through stuffing-boxes, and are connected at their upper ends to a cross-head, L, as clearly shown in fig. 4.

To one end of this cross-head L is pivoted a pendent pitman, K, jointed at its lower end to the long arm of an elbow-lever, J, which is pivoted on a stud, P, near the outer edge of the case, as shown in fig. 2.

The short arm of this lever J is connected with the reciprocating bar I, moved in one direction by the cam H, and brought back by the spring O.

One end of the bar I is formed into a rectangular frame, which surrounds the shaft B, as shown in figs. 2 and 4, thus supporting the bar, and guiding it in its movement.

On the outside of the bar, at its end, is a projecting portion, *d*, and on the shaft B is a cam, H, which is so located, that when the piston *b*, in its revolution, has nearly reached the stop-head E, said cam will strike projection *d*, and force the bar I over and, through the medium of the lever J and pitman K, move the stop-head up, and thus allow the piston to pass, by which time the cam will have passed the stud or projection, and the spring O will bring the parts back to their original positions.

The induction-port for the steam is shown at *e*, fig. 3, being located as close as possible to the stop-head, and the eduction-port at *f*, close on the opposite side of the stop-head.

*Assignor to himself, A. Limberg, William Schrader & Hermann Kroese of the same place.

Over the induction-port *e* is placed a steam-chest, M, into which the steam is admitted through the pipe *m*, and within this chest is located a slide-valve, F, playing over the mouth of the port, and being operated by an eccentric, G, on the shaft B, which is connected with it by a stem, *o*, playing through a stuffing-box on the under side of the chest, all as shown in figs. 1 and 4.

The purpose of this valve is to shut off the steam while the stop-head is raised, and until the piston passes by the port, and also for regulating the supply of steam when working expansively.

The exhaust-port is at all times open, there being no valves connected with it.

When the engine is to be operated, the shaft B is turned, so as to shut down the stop-head, and open the port *e*. Steam is then turned on, and, entering through said port, will force the head *b* around in the chamber D, until it reaches the exhaust-port *f*, when the valve F will cut off the steam, and as soon as the piston passes the port *f*, the steam in the chamber D will escape through it, the stop-head rising at the same time, so that the piston may pass.

As soon as the piston has got past the stop-head it closes down, and, as soon as the piston is past the port *e*, the valve F opens, and steam is admitted, and so on successively.

On the shaft B, outside of the case, I secure any desired gearing or pulleys, from which to connect with the apparatus or machinery to be driven, the drawings showing a fly-wheel, P, on one end, and a pulley, R, on the other.

If desired, two or more stop-heads may be used, located at different points around the case, or several piston-heads formed on the disk C, thus having the force of the steam exerted to move the engine at all points in its revolution, and not requiring the pistons to be carried past the stop-heads by the momentum of the fly-wheel, as is the case where a single piston and stop-head are used.

This engine may be so built as to run in either direction at will, and, by adjusting the valve F and its connections, will work expansively.

Instead of the stop-head sliding, as described, it may be pivoted at one side, and swing or turn out into the extension-chamber, as shown in fig. 5.

It is obvious, that if desired, the chamber D may be of a rectangular or elliptical form in its cross-section, the circular form being adopted only because of the ease of building and fitting the parts.

Having thus described my invention,

What I claim, is—

A rotary steam-engine, consisting of the case, with the chamber D, the disk *c*, with the piston or wing *b*, and the sliding-head E, operated by the elbow-lever J, yoke I, and cam H, all arranged substantially as described.

THOS. McEWEN.

Witnesses:
 WM. H. LOTZ,
 A. LIMBERG.